Figure 1:
Figure 2:
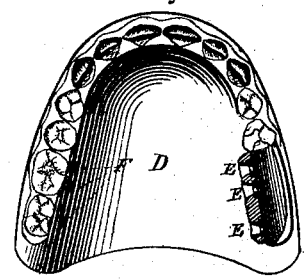
Figure 3:
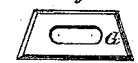
Figure 4:
Figure 5:

B. J. FIELD.
Plate for Artificial Teeth.

No. 160,582. Patented March 9, 1875.

WITNESSES.
J. Wm. Larner
Chas. W. Lemon

INVENTOR.
Benton J. Field
per F. A. Lehmann Atty.

UNITED STATES PATENT OFFICE.

BENTON J. FIELD, OF LEAKSVILLE, NORTH CAROLINA.

IMPROVEMENT IN PLATES FOR ARTIFICIAL TEETH.

Specification forming part of Letters Patent No. 160,582, dated March 9, 1875; application filed February 8, 1875.

*To all whom it may concern:*

Be it known that I, BENTON J. FIELD, of Leaksville, in the county of Rockingham and State of North Carolina, have invented certain new and useful Improvements in Plates for Artifical Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in plates for artifical teeth, by making the plate in part of metallic nuts, shaped so as to allow the other part of the plate, that may be made of some other material, to close around and under them, as will be more fully described hereafter.

The accompanying drawings represent my invention.

A represents an artificial tooth from the rear side, from which projects the flat-headed pin b, for the purpose of fastening the tooth to the plate. In order to get a strong hold on the plate, and at the same time to facilitate the repairing of broken teeth that may have to be removed and replaced by others, I place over the pins b that part of the plate which I call the nut, the sides of which are beveled, so that the upper part is larger than the under side. The opening in the nut, through which the heads of the pins b pass, is shaped so that when the flat heads of the pins are turned sidewise they cannot repass it, but press the tooth firmly against the nut. That part of the plate which may be made of some other material lodges around the projecting upper side of the nut, so that the nut is entirely embedded in or surrounded by it. D represents an upper plate with two teeth off. E are nuts embedded in the other part of the plate after it is comparatively finished. F are holes bored through the plate, to show the inside of the nuts after they have been united with the other part of the plate. G is an enlarged view of the nut. H is the nut attached to the tooth by turning the flat head of the pin across the oblong hole.

In case a tooth has to be removed and another replaced, the nut E, remaining in place, offers a firm and reliable foundation to which to fasten the tooth, and removes entirely the danger of injuring the plate.

The teeth may be attached before or after the plate is comparatively finished. In the former case the nuts must be passed over the pins, and their heads turned to fasten them on. In the latter case the nuts must be left loose on the pins when united to the other part of the plate.

For making that part of the plate which may be made of some other material, I refer to the different methods known to the profession, but like the Morrison plan better than any other.

Plates made by my invention have all the necessary strength of metallic plates. They have the lightness and elasticity of gum plates without their objections, and teeth can be attached to them quicker than to any other plate in use.

Having thus described my invention, I claim—

The combination of the nut with that part of the plate which may be made of some other material, the nut being embedded in or surrounded by said material, and making a part of the plate, and used in combination with a flattened pin in the tooth, which is keyed by being turned in the recess of the plate, substantially as described.

In testimony that I claim the foregoing I have hereunto set my hand and seal this 27th day of January, 1875.

BENTON JEREMY FIELD. [L. S.]

Witnesses:
  WM. S. MARTIN,
  WM. F. MARTIN.